United States Patent [19]
Chen

[11] Patent Number: 5,483,858
[45] Date of Patent: Jan. 16, 1996

[54] SAWING MACHINE HAVING ANGLE-ADJUSTABLE CLAMPING MECHANISM AND SAFETY ALIGNMENT MECHANISM

[75] Inventor: Tony Chen, Taipei, Taiwan

[73] Assignee: Ko Shin Electric and Machinery Co., Ltd., Taipei, Taiwan

[21] Appl. No.: 257,122

[22] Filed: Jun. 9, 1994

[51] Int. Cl.⁶ ......................................... B26D 7/02
[52] U.S. Cl. .................... 83/464; 83/465; 83/466; 83/468.3; 83/581; 269/303; 269/319
[58] Field of Search ................... 83/452, 464, 465, 83/466, 468, 468.2, 468.3, 468.7, 581, 490; 269/303, 315, 319

[56] References Cited

U.S. PATENT DOCUMENTS

| | | | |
|---|---|---|---|
| 4,133,237 | 1/1979 | Lewin | 83/468.3 |
| 4,265,154 | 5/1981 | Batson | 83/468 |
| 4,283,977 | 8/1981 | Batson | 83/466 X |
| 5,146,826 | 9/1992 | Shiotani et al. | 83/581 X |
| 5,161,443 | 11/1992 | Huang | 83/464 X |
| 5,249,495 | 10/1993 | Renk | 83/468.3 |
| 5,347,902 | 9/1994 | Brickner et al. | 83/468.3 |

*Primary Examiner*—Eugenia Jones
*Attorney, Agent, or Firm*—Bacon & Thomas

[57] ABSTRACT

A power-controlled sawing machine provided with a clamping and angle-adjusting mechanism and a safety alignment mechanism. The clamping and angle-adjusting mechanism consists of first and second clamping plates to clamp an object to be cut therebetween. The second clamping plate further effects the adjustment of the angular position of the second clamping plate relative to the sawing direction. The safety alignment mechanism includes a stop plate which can be moved and turned to align with the second clamping plate so as to prevent a cut piece from bouncing out and injuring people.

3 Claims, 6 Drawing Sheets

SAWING MACHINE HAVING ANGLE-ADJUSTABLE CLAMPING MECHANISM AND SAFETY ALIGNMENT MECHANISM

BACKGROUND OF THE INVENTION

The present invention relates to a sawing machine, and more particularly to a sawing machine equipped with an angle-adjustable clamping mechanism and a safety alignment mechanism so that an object to be cut can be selectively positioned at different sawing angles relative to the saw web and the cut piece is prevented from dangerously springing away from the cut object at the instant piece is completely severed therefrom.

When cutting an object by means of a conventional sawing machine, it is generally necessary for the operator to firmly hold or press the object to be cut with one hand, or use a simple-featured jig to fix the object to be cut at one suitable end, so that the object may be cut or sawed in a more accurate manner.

However, it is very dangerous to the operator if he or she has to hold the object to be cut with one hand while watching over the correct sawing angle due to the undesirable vibration of the object during the sawing operation. In the case of using one or more jigs, the object to be cut must be fixed to the sawing machine and without the possibility of being conveniently adjusted to a desired cutting angle. Moreover, in either of the above two holding methods, the small piece being cut off from the object very often and unexpectedly springs from the sawing machine due to the torque generated by the moving saw web against the object being sawed and thereby tends to injure the operator or someone else in the surrounding work place.

The present invention eliminates the existing drawbacks in the conventional sawing machines.

SUMMARY OF THE INVENTION

It is a primary object of the present invention to provide a sawing machine having an angle-adjustable clamping mechanism for holding an object on a sawing machine and preventing undesirable vibrations during the sawing operation.

Another object of the present invention is to provide a sawing machine having an angle-adjustable clamping mechanism so that the angular position of the object to be cut can be selectively adjusted relative to the saw web.

A further object of the present invention is to provide a sawing machine having a safety alignment mechanism which prevents a cut piece from springing out and injuring people at the instant the piece is severed.

A still further object of the present invention is to provide a sawing machine having a safety alignment mechanism which can be changed in its position on the sawing machine so as to prevent a longer cut piece of the cut object from unexpectedly springing out and injuring people.

To achieve the above mentioned and other objects, the present invention includes a clamping mechanism to firmly hold an object to the saw table of a sawing machine, an angle-adjusting mechanism to adjust the angular position of the clamping mechanism relative to the saw web, and a safety alignment mechanism to prevent the cut pieces from bouncing out to unexpectedly hurt people the instant the pieces separate from the cut object. The safety alignment mechanism can also be shifted and turned to correspond to the angle set by the angle-adjusting mechanism to effectively stop cut pieces of different lengths from springing out at different angles.

BRIEF DESCRIPTION OF THE DRAWINGS

The detailed structure, applied principles, functions and performance of the present invention can be best understood from the following detailed description of the preferred embodiment and the accompanying drawings, wherein.

DETAILED DESCRIPTION OF THE PREFERRED EMBODIMENT

Figure 1:
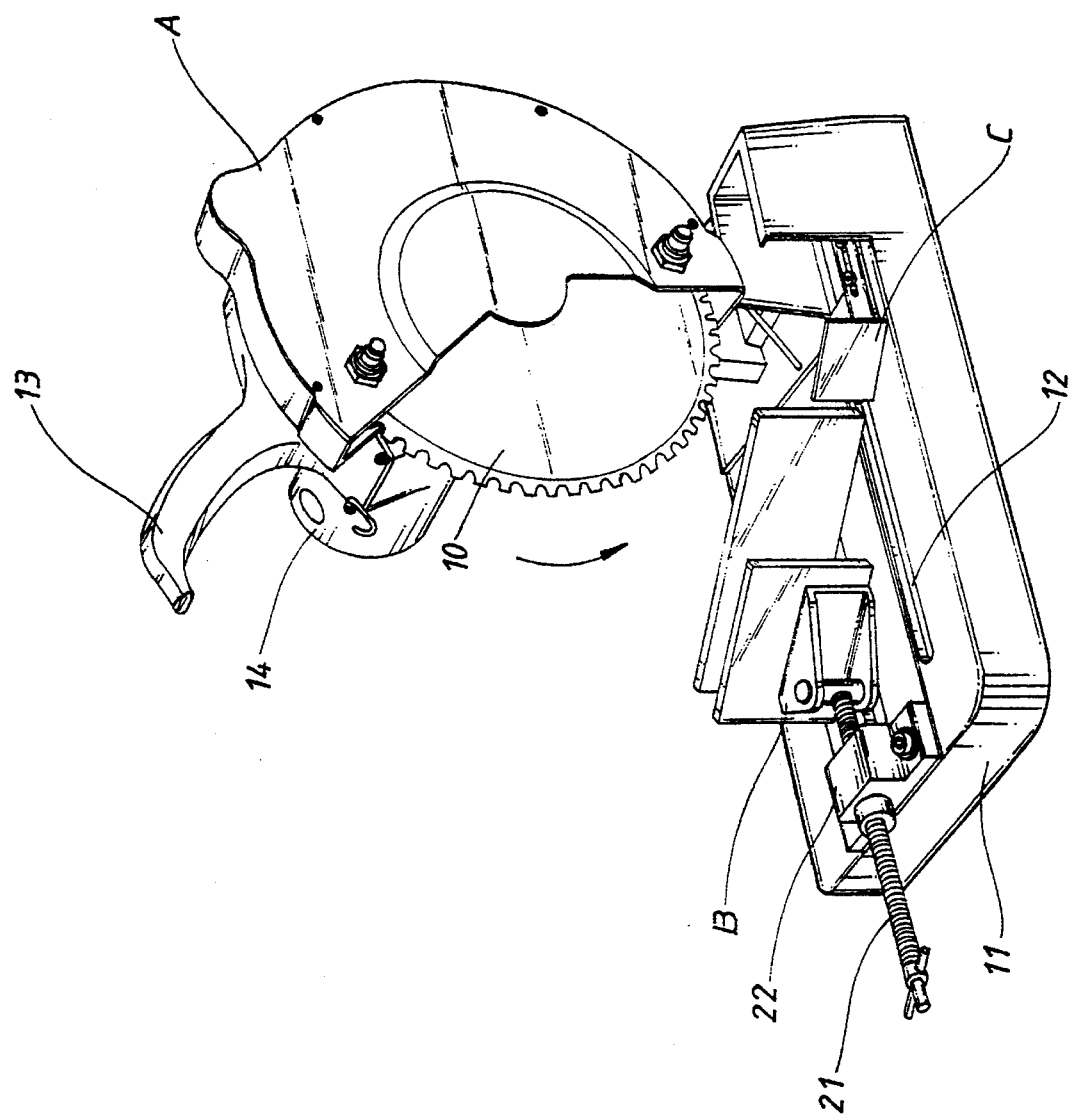
FIG. 1 is a perspective view of an embodiment of a sawing machine according to the present invention.

As seen in FIG. 1, the present invention includes a base 11 on which a power-controlled sawing device A, an angle-adjustable clamping mechanism B, and a safety alignment mechanism C are installed. The power-controlled sawing device A further consists of a saw web 10, a motor 14 for driving the saw web 10 to rotate same, a grip 13 for manually controlling the up and down movement of the saw web 10. The base 11 has a sawdust slot 12 formed thereon to receive; and discharge sawdust produced during the sawing operation.

Figure 2:
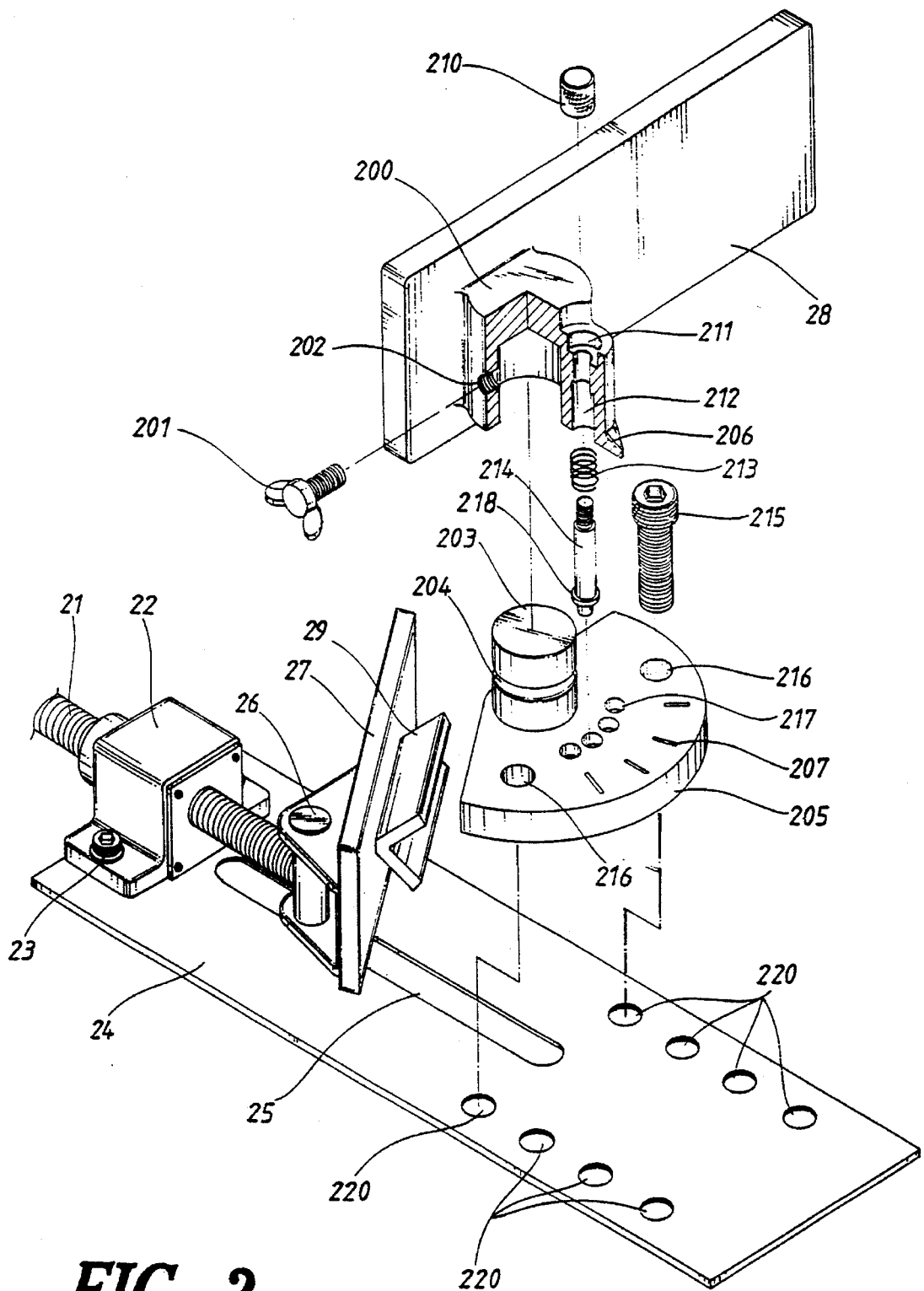
FIG. 2 is an exploded perspective view of the angle-adjustable clamping mechanism of the present invention.

As seen in FIG. 2, the angle-adjustable clamping mechanism B mainly consists of a first clamping plate 27 and a second clamping plate 28 for holding an object to be cut therebetween. The first clamping plate 27 is pivotally connected to a movable shaft 26 so that the first plate 27 is allowed to swing leftward or rightward. The movable shaft 26 is fixedly connected to one end of a threaded rod 21 which passes through a fixing seat 22 fixed onto a bottom plate 24 by means of two screws 23. When the threaded rod 21 is rotated, the movable shaft 26 connected to one end thereof and the first clamping plate 27 pivotally connected to the movable shaft 26 ,are brought to move forward or backward in and along a guide groove 25 formed on the bottom plate 24. The first clamping plate 27 has a V-shaped piece 29 welded to the first clamping plate 27 to form a surface for contacting the object to be cut. The clamping piece 29 is so designed that it may clamp objects of different configurations, such as a round tube, a triangular rod, etc.

The second clamping plate 28 further consists of a fixed sleeve 200 attached to a surface thereof opposite to the side contacting the object to be cut. The fixed sleeve 200, together with the second clamping plate 28, is supported on a shaft 203 projecting upwardly from a seat 205. A thumbscrew 201 is used to pass through a threaded hole 202 formed on the fixed sleeve 200 and extend into a neck groove 204 provided on the upward projected shaft 203 so that the second clamping plate 28 is securely joined with the projected shaft 203 without easily separating therefrom.

With reference to FIGS. 2, 3, 4 and 5, the fixed sleeve 200 further has a front projected portion in which an upper knob cavity 211 and a lower spring cavity 212 are separately formed. The lower spring cavity 212 is formed to receive a coil spring 213 therein. A locating pin 214 having a lower flange 218 is inserted upwardly into the spring cavity 212 to pass through the coil spring 213, such that the coil spring 213 is retained in the spring cavity 212 by the lower flange 218 of the locating pin 214. A knob 210 is screwed to an upper end of the locating pin 214 projecting out of the spring cavity 212 and extending into the knob cavity 211, such that a part of the knob 210 projects from the knob cavity 211. The locating pin 214 has a bottom end projecting downwardly out of the spring cavity 212 and extending into one of a plurality of locating holes 217 formed on the seat 205. The locating holes 217 are predetermined according to specific angles possibly required during the sawing operation. To adjust the angle of the second clamping plate 28 relative to the sawing direction, the knob 210 is pulled upwardly to separate the locating pin 214 from the locating hole 217, and thereafter turn the second clamping plate 28 about the shaft 203 so that the second clamping plate 28 locates at a desired angle relative to the sawing direction. When the desired angle is determined, the knob 210 is released and the coil spring 213 shall push the locating pin 214, bringing the bottom end of the latter to insert into another selected locating hole 217. The seat 205 is fixed to the bottom plate 24 by separately screwing two fixing threaded rods 215 through two holes 216 formed on the seat 205 and engaging rods 215 with two corresponding threaded holes 220 formed on the bottom plate 24. There may be a multiple rows of matched threaded hole pairs 220 formed on the bottom plate 24 to provide different options of position for the seat 205 in order to receive objects of different thickness between the first and the second clamping plates 27, 28.

Figure 3:
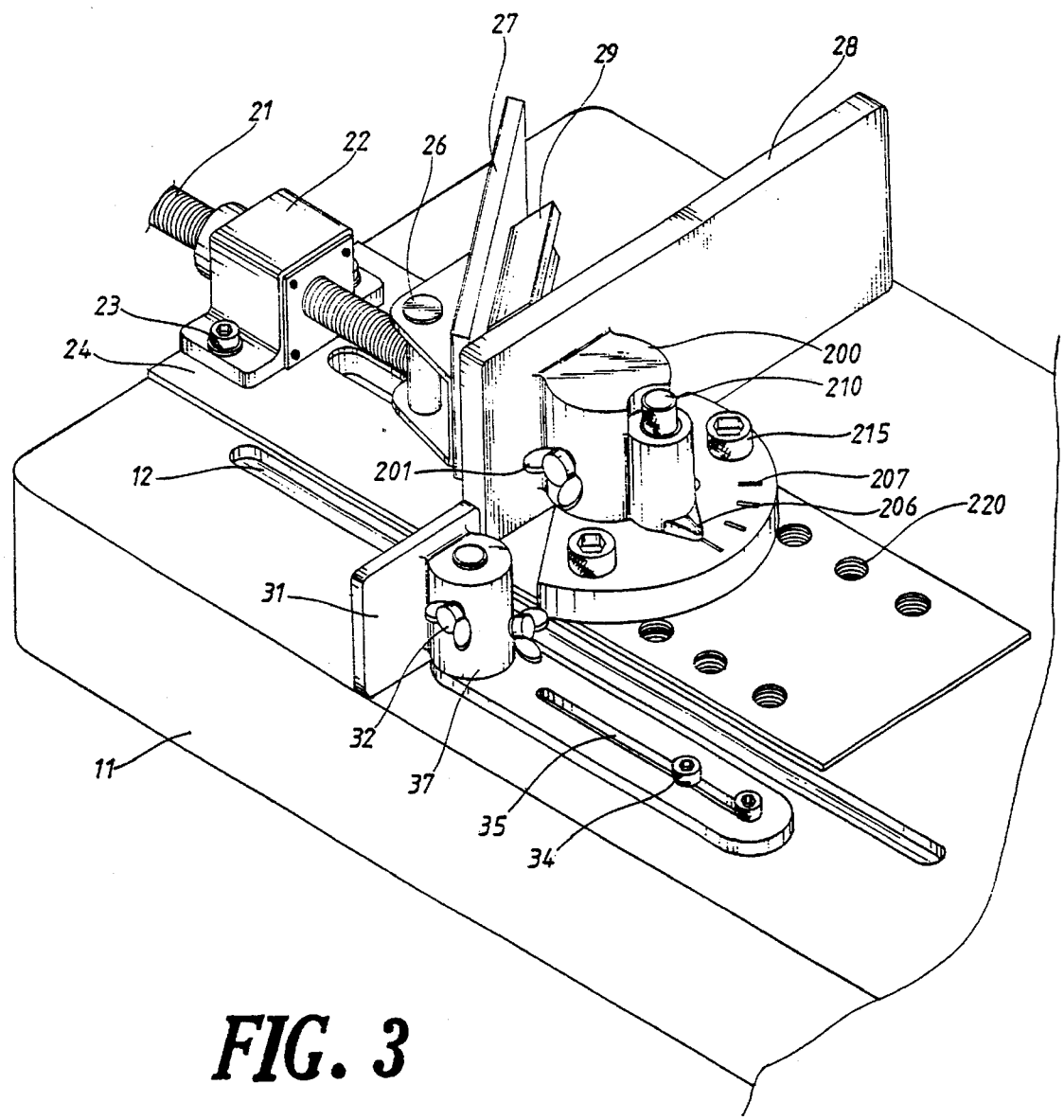
FIG. 3 is a perspective view of the assembled angle-adjustable clamping mechanism located at a position normal to the sawing direction.
Figure 6:
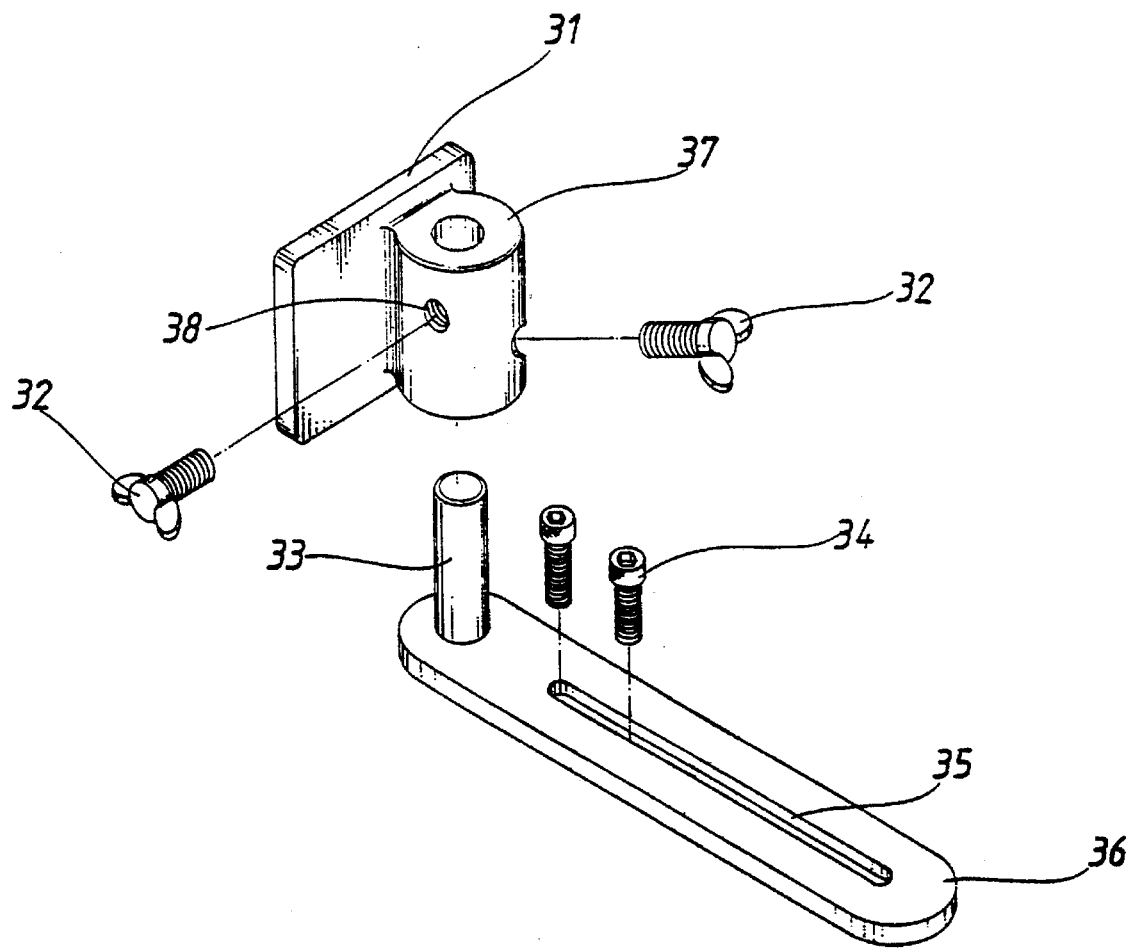
FIG. 6 is an exploded perspective view of the safety alignment mechanism of the present invention.

As shown in FIGS. 3 and 6, the safety alignment mechanism C is disposed on the base 11 opposite to the angle-adjustable clamping mechanism B and relative to the sawdust slot 12. The safety alignment mechanism C further consists of a stop plate 31 having a fixedly attached sleeve 37. The sleeve 37 is supported on and fixed to a fixing shaft 33 by separately screwing two thumbscrews 32 through two threaded pin holes 38 formed on the sleeve 37 at different heights and different angles, so that the thumbscrews 32 firmly press against the fixing shaft 33, thus preventing the stop plate 31 and the sleeve 37 from easily disengaging from the fixing shaft 33. The fixing shaft 33 is fixed to a sliding seat 36 which has a sliding slot 35 formed therein. The sliding seat 36 is attached to the base 11 by means of screws 34. By adjusting the tightness of the screws 34 screwed to the base 11 through the sliding slot 35 of the sliding seat 36, the sliding seat 36 can be slid forward or backward in the direction of sawing. The sleeve 37 is eccentrically disposed on the stop plate 31 in a vertical direction, so that the respective distances between the sleeve 37 and the two lateral edges of the stop plate 31 are different. When the stop plate 31 is turned upside down so that the sleeve 37 is supported on the fixing shaft 33 with a longer part of the stop plate 31 extending toward the sawdust slot 12, a longer cut piece of the cut object can be prevented from bouncing away from the sawing machine. Conversely, when the shorted cut piece of the cut object is formed, the stop plate 31 can be turned to have its shorter part extending toward the sawdust slot 12.

Figure 4:
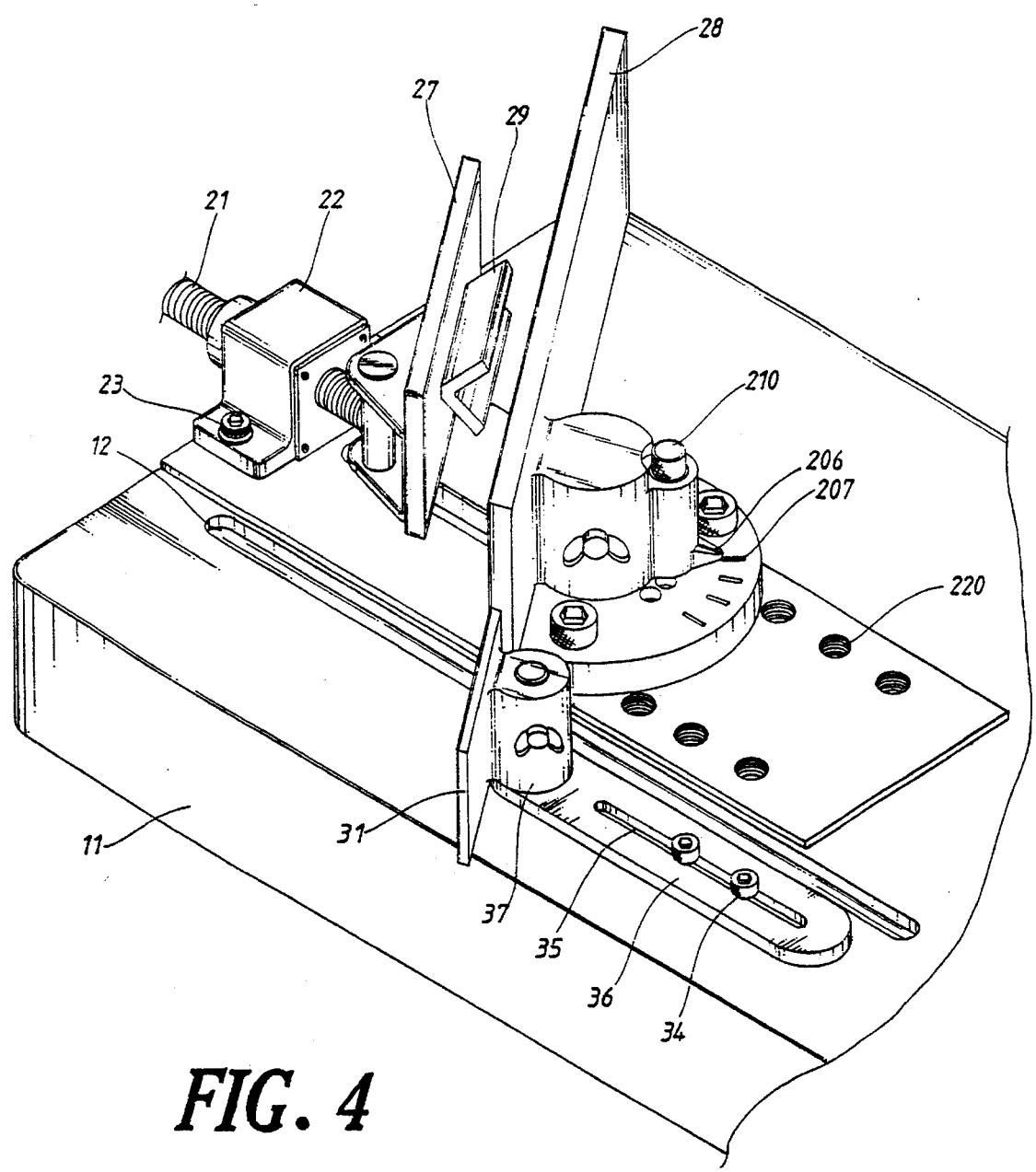
FIG. 4 is a perspective view of the assembled angle-adjustable clamping mechanism located at a position forming an oblique angle with the sawing direction.
Figure 5:
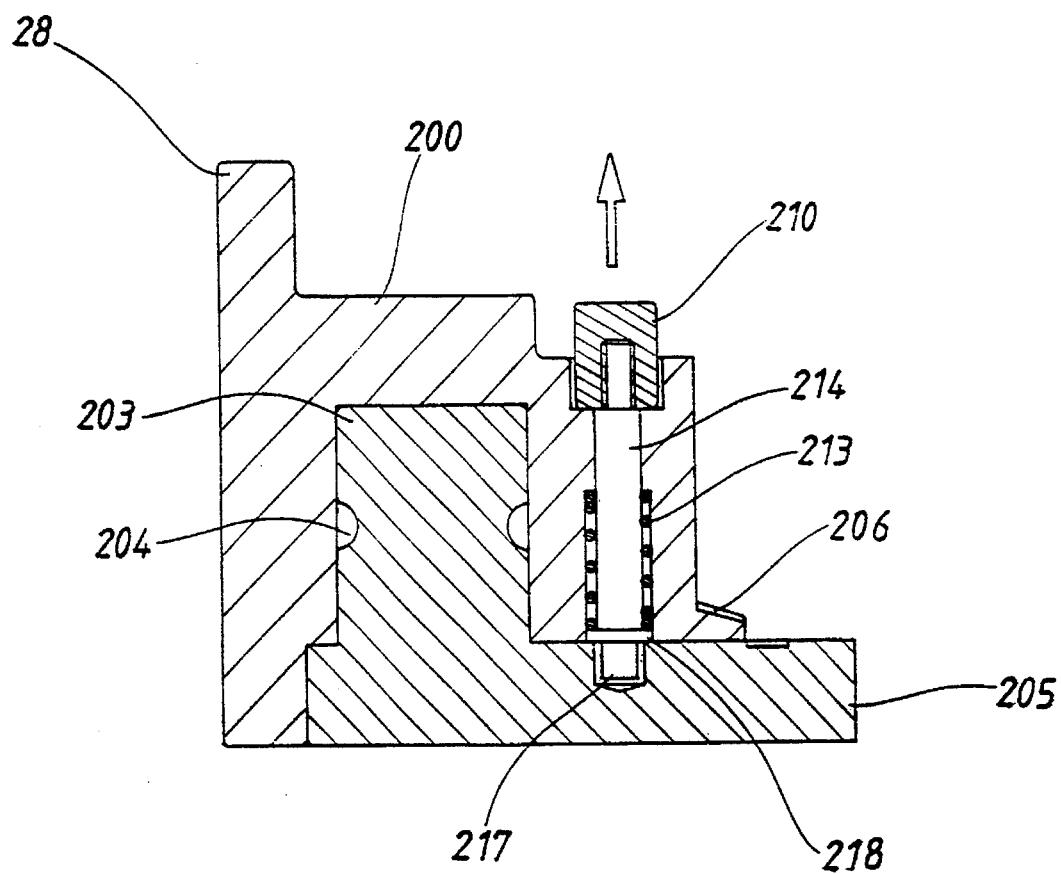
FIG. 5 is a sectional side view of the angle-adjustable clamping mechanism of the present invention.

With reference to FIGS. 3 and 4, the angular position of the clamping plate 28 relative to the sawing direction can be set by means of a pointer 206 connected to an immediate lower front of the front projected portion of the fixed sleeve 200. The degree of angle can be determined from the readings 207 indicated on the seat 205. To correspond to the different angular positions of the second clamping plate 28, the safety alignment mechanism C is adjusted to move forward or backward and to have a similar angular position as that of the second clamping plate 28 so that the stop plate 31 aligns with the second clamping plate 28. To achieve the angular adjustment of the safety alignment mechanism C, the two thumbscrews 32 are loosened and the sleeve 37 is rotated to a desired angular position, and the thumbscrews 32 are again tightened. And, to align the stop plate 31 with the second clamping plate 28, the screws 34 are loosened to move the sliding seat 36 forward or backward relative to the second clamping plate 28.

I claim:
1. A sawing machine comprising:
   a) a base including a top surface;
   b) a power-controlled sawing device, a clamping and angle-adjusting mechanism, and a safety alignment mechanism supported on the base;
   c) the clamping and angle-adjusting mechanism including a first clamping plate, a second clamping plate, a bottom plate on the top surface of the base, a rotatable threaded rod mounted on the bottom plate, the first clamping plate being pivotally connected to the threaded rod for forward and backward movement during rotation of the threaded rod, the second clamping plate including a first sleeve integrally formed thereon, a seat mounted on the bottom plate, the second clamping plate being secured to the seat through the first sleeve, an angle-adjusting mechanism carried by the first sleeve and including a locating pin, a spring and a knob secured to the locating pin for permitting the second clamping plate to be selectively fixed in one of plural angular positions relative to the seat in correspondence to a sawing direction defined by the sawing machine; and
   d) the safety alignment mechanism including a stop plate, a second sleeve integrally formed on the stop plate, a sliding plate movably mounted on the base, a shaft fixed to the sliding plate, the second sleeve being rotatably supported on the shaft, and a fastening means for securing the sliding plate in a desired position on the base and permitting the stop pate to be rotated to a desired angle of alignment with the second clamping plate.

2. The sawing machine of claim 1 wherein the stop plate includes two lateral edges and the second sleeve is eccentrically positioned between the two lateral edges and at different distances therefrom.

3. The sawing machine of claim 1 wherein the first clamping plate includes a front surface and a V-shaped clamping piece attached to the front surface for contacting an object to be cut.

* * * * *